United States Patent [19]

Klapproth et al.

[11] 4,098,513
[45] Jul. 4, 1978

[54] SUSPENSION DEVICES FOR THE CHASSIS OF A RECORDING AND/OR REPRODUCING APPARATUS

[75] Inventors: Ludwig Klapproth, Lahr; Gerhart Metzler, Offenburg; Peter Rother, Lahr, all of Germany

[73] Assignee: Geratewerke Lahr GmbH, Lahr, Germany

[21] Appl. No.: 724,225

[22] Filed: Sep. 17, 1976

[30] Foreign Application Priority Data

Sep. 22, 1975 [DE] Fed. Rep. of Germany ....... 2542185

[51] Int. Cl.² ................................................ G11B 3/60
[52] U.S. Cl. .................................................. 274/39 A
[58] Field of Search .............. 248/358 R, 358 AA, 24, 248/20, 21; 274/39 A, 39 R

[56] References Cited

U.S. PATENT DOCUMENTS

| 1,853,650 | 4/1932 | Zullo | 274/39 R |
| 1,917,633 | 7/1933 | Burt | 274/39 A |
| 2,413,740 | 1/1947 | Wikander | 248/358 R |
| 2,935,313 | 5/1960 | Momchilov et al. | 247/358 AA |

FOREIGN PATENT DOCUMENTS

| 1,937,429 | 7/1969 | Fed. Rep. of Germany. | |
| 639,666 | 5/1962 | Italy | 248/20 |
| 782,933 | 9/1957 | United Kingdom | 248/358 R |

Primary Examiner—Harry N. Haroian
Attorney, Agent, or Firm—Fleit & Jacobson

[57] ABSTRACT

The chassis of a recording and/or reproducing apparatus such as a record player is mounted to a fixed structure such as a housing of the apparatus by one or more suspension devices. The chassis, parts carried thereby and the suspension device or devices are arranged to form an oscillatory system in which the vertical and the horizontal oscillating movements are decoupled from each other so that the three orthogonal oscillation directions or directions of movement do not mutually influence each other.

19 Claims, 4 Drawing Figures

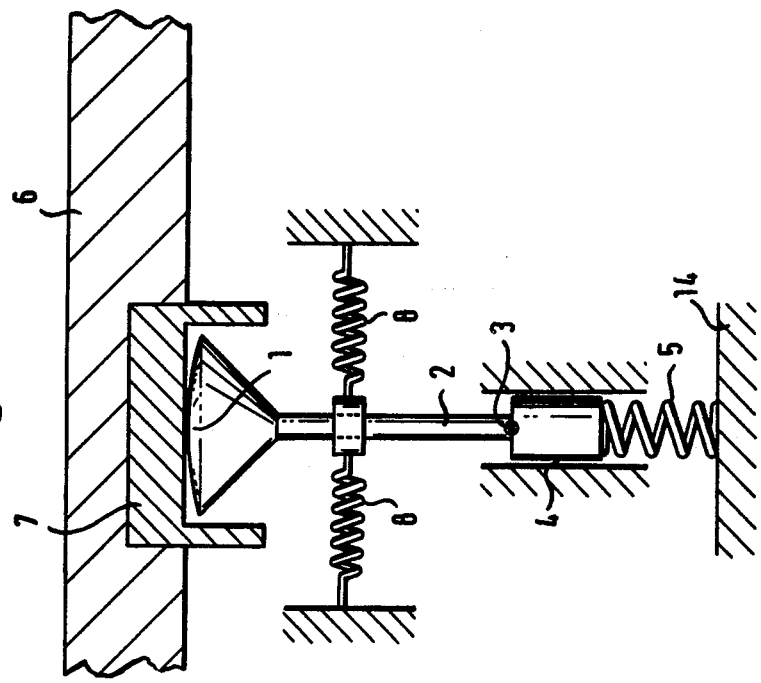
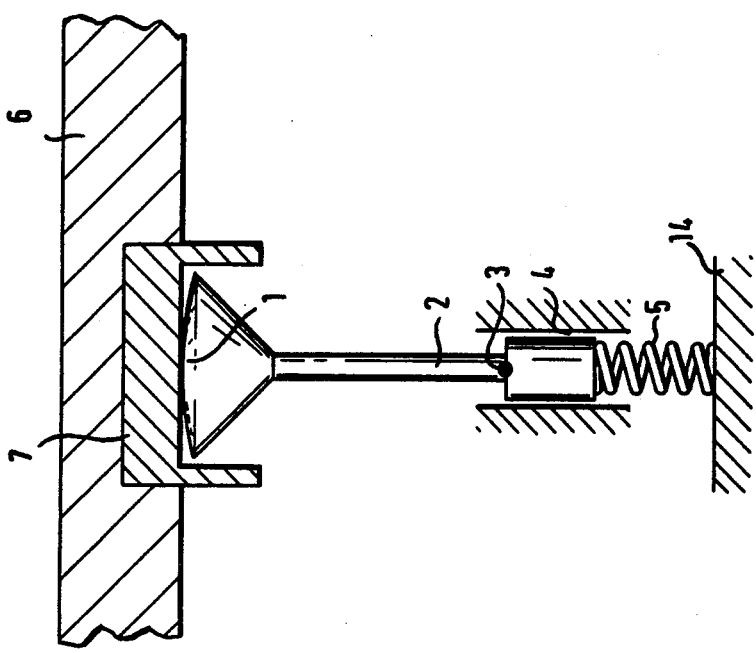

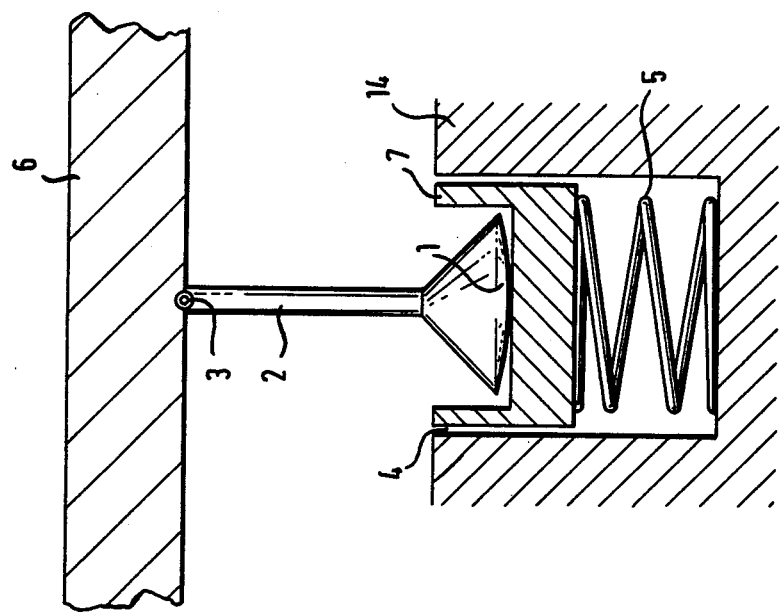
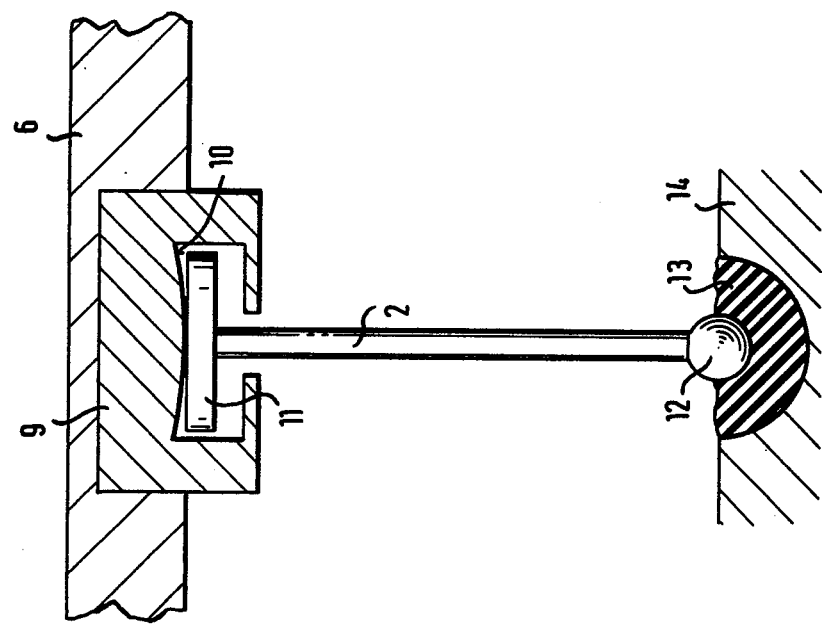

SUSPENSION DEVICES FOR THE CHASSIS OF A RECORDING AND/OR REPRODUCING APPARATUS

BACKGROUND OF THE INVENTION

1. Field of the invention

This invention relates to recording and/or reproducing apparatus, in particular a record player and more specifically relates to suspension means by which a chassis of the apparatus, which carries means for recording and/or reproducing, is suspended or supported relative to a fixed structure such as housing or housing frame.

2. Description of the prior art

Various suspension means incorporating resilient elements are known for suspending a chassis of a recording and/or reproducing apparatus, in particular a record player. Traction and compression springs, with or without additional damping, can be used for this purpose. It is also known to use suspended swinging members. Furthermore, resilient balls filled with a damping fluid are used in known apparatus to form resilient elements. These known suspension means are not satisfactory since when there is a deflection movement in a given direction, which occurs for example in the case of a jolt, they do not react with a force in the precisely opposite direction. This means that when such suspension or support means are put to practical use, when there is a simple translatory deflection movement, as frequently occurs in practice, the apparatus replies with complicated superimposed reaction movements comprising translation and rotational oscillating movements. In the case of a record player, which is additionally influenced by the gyroscopic forces of the turntable, such reaction movements mean that the degree of reliability of sound pick-up is severely impaired or even totally destroyed as the pick-up arm, by virtue of its mounting, does not perform rotational movements and is activated to a state of severe natural oscillation due to the resulting relative movement.

SUMMARY OF THE INVENTION

It is therefore an object of the present invention to provide an oscillation-insulating suspension which overcomes the above-mentioned disadvantages and which, without high cost, provides that, in the event of a deflection which is produced for example by a jolt, the chassis performs reaction movements which are substantially only in the form of translatory oscillating movements.

This object is achieved in accordance with the invention in that the chassis, the components carried thereby and at least one suspension device connecting the chassis to fixed structure such as a housing are arranged to form an oscillatory system in which the vertical and the horizontal oscillating movements are decoupled from each other so that the three orthogonal oscillation directions or directions of movements do not mutually influence each other.

In order to provide this, the chassis can be supported by means of a rigid support member mounted by a pivotal joint in such a manner that an imaginary connecting line between a support point and the pivotal joint of the support member always lies in the direction of one of the main directions of oscillating movements, preferably in a vertical direction.

In addition, the support member can be resiliently or elastically mounted in the direction of the imaginary connecting line between the support point of the support member and the pivotal joint.

In order to ensure that the imaginary connecting line between the support point of the support member and the pivotal joint always coincides with one of the possible main directions of oscillating movement, and in addition, and in particular, to ensure that the distance between the support point and the pivotal joint remains constant even when movement of the chassis with respect to the fixed structure is occurring, the chassis or the support member can be so cnstructed that the various support points which are possible during such movement all lie on a common spherical surface.

The spherical surface preferably has a radius which corresponds to the distance between the pivotal joint and the support point in a rest condition.

If the spherical surface is provided on the chassis, the support member can be provided with a co-operating mounting which has a flat surface. If the spherical surface is provided on the support member, there is provided a co-operating mounting which has a flat surface. During movement, the spherical surface then rolls against the flat surface of the co-operating mounting. This construction ensures that the chassis only moves, for example, in a horizontal direction. If the chassis is also to be movable in a perpendicular direction relative thereto, then, as already mentioned, the support member can be resiliently or elastically supported with respect to the support or the housing, in which case the movements in the horizontal direction and the movements in the vertical direction are then completely decoupled from each other.

In order substantially to avoid moments which can act on the oscillating system, it is of advantage for the common centre of gravity of the chassis and of the parts which are carried thereby to be placed in a plane which includes the point of engagement of the support member on the chassis and which lies perpendicularly to the imaginary connecting line between the support point and the pivotal joint, in particular in the rest condition of the system. If there are a plurality of the said suspension devices, it is advatageous for the centre of gravity of the oscillatory system to be placed at the force centre point of all forces which are applied to the chassis by way of the support members.

It is also of advantage to provide return springs which engage the support member. In this way, the rest position of the chassis and the resonance frequency in the horizontal direction can be precisely defined. For this purpose, the forces of the return springs can be perpendicular to the imaginary connecting line between the support point and the pivotal joint.

Additional damping means can also be provided, and can be effective in particular in the region of the support point on the support member. To this end the above-mentioned co-operating mountings can comprise damping material or can be respectively mounted by a damping material.

In order to achieve an even more effective suppression of rotational oscillating movements, it is of advantage for the resonance frequency of the oscillatory system in one main direction of oscillating movement to be so selected as to be higher than in another direction of oscillating movement.

Advantages which are achieved with the invention are in particular that there is provided an oscillationisolating suspension or support action which provides that, when the support chassis is subjected to a deflection movement, oscillations and movements which are coupled to each other are prevented from occurring. In particular, the invention provides that reaction movements in the form of coupled translatory and rotational oscillating movements are prevented: with the present invention there is provided a decoupling of vertical and horizontal oscillations.

Accordingly, the invention can advantageously be used in those apparatuses in which there are sensing members, in particular mechanical sensing members, whose function is detrimentally affectd by vibration. Accordingly, the invention is particularly applicable to record players, especially as the pick-up arms in record players are subjected to translatory interference movements, which may be of considerable magnitude, without the reliability of pick-up action being substantially impaired.

BRIEF DESCRIPTION OF THE DRAWINGS

The invention will now be described in greater detail, by way of example, with reference to the accompanying drawings, in which:

FIG. 1 is a diagrammatic view of a first support or suspension device;

FIG. 2 is a diagrammatic view of a second support or suspension device;

FIG. 3 is a diagrammatic view of a third suppport or suspension device; and

FIG. 4 is a diagrammatic view of a fourth support or suspension device.

DETAILED DESCRIPTION OF THE PREFERRED EMBODIMENT

Throughout the various figures of the accompanying drawings, like reference numerals designate like items. In each of the figures, it is assumed that the illustrated suspension device is arranged vertically to mount a chassis 6 of a recording and/or reproducing apparatus to a fixed structure 14, which may be a housing frame of the apparatus. All of the illustrated suspension devices include a support member 2.

Referring now particularly to FIG. 1, the illustrated suspension device also includes a pivotal joint 3 and guide means 4 and a compression spring 5 for the joint 3. The support member 2 is pivotally mounted by the joint 3. The guide means 4 positively guides the lower end portion of the support member 2 for movement only in a vertical direction. The spring 5 resiliently biasses the support member 5 in a vertical direction. The upper end of the support member 2 is provided with a spherical sector 1 defining a spherical surface which is in contact with a flat surface in a co-operating mounting 7 secured to the chassis 6.

The suspension device shown in FIG. 2 is substantially the same as that shown in FIG. 1, except for the provision of return springs 8 engaging the support member. The forces of the return springs 8 are directed horizontally and mutually cancel each other.

The suspension device shown in FIG. 3 differs from that shown in FIG. 1 in the following respects. The pivotal joint 3 is replaced by a pivotal joint in the form of a mounting ball 12 which is mounted in a mounting element 13 of a resilient material, the element 13 replacing the spring 5. The upper end of the support member has, instead of the sector 1, a portion 11 having a flat upper surface.

Instead of the mounting 7, the chassis 6 has fitted thereto a mounting 9 having a spherical surface 10 which is in contact with the flat upper surface of the portion 11 of the support member 2.

The construction of the suspension device shown in FIG. 4 is described hereinbelow.

The mode of operation of the support or suspension devices shown in the drawings will now be described in detail.

If, in the device shown in FIG. 1, the chassis 6 with the co-operating mounting 7 moves horizontally relative to the structure 14, then the spherical surface of the sector 1 rolls against the flat surface of the mounting 7 and the support member 2 on which the sector 1 is arranged pivots about the pivotal joint 3. The point where the spherical surface of the sector 1 contacts the flat surface of the mounting 7 to support the chassis 6 will hereinafter be referred to as the "support point." If the radius of the spherical surface of the sector 1 corresponds to the distance of the spherical surface of the sector from the pivotal joint 3, the distance between the chassis 6 and the pivotal joint 3 remains constant throughout the range of the rolling movement. That is to say, whatever the relative position adopted by the chassis 6 and structure 14 an imaginary line connecting, on the one hand, the support point where the spherical surface of the sector 1 meets the flat surface of the co-operating mounting 7 and, on the other hand, the pivotal joint 3, always extends vertically, that is to say, in one of the main directions of movement of the oscillatory system constituted by the chassis 6, the support member 2, the pivotal joint 3 and the compression spring 5. This means that, in the event of horizontal movement of the chassis 6, no additional loading extra to the static loading due to the weight of the chassis 6 is imparted to the compression spring 5. On the other hand, vertical alternating loadings or movements of the chassis 6 results only in a loading on the compression spring 5 and do not result in horizontal reaction movements of the chassis 6. In this case, the pivotal joint 3 only moves vertically in the guide means 4.

If both horizontal and vertical reaction movements of the chassis 6 occur, these are completely decoupled from each other, as the horizontal oscillating movements cannot influence the vertical oscillating movements of the support member 2 or the pivotal joint 3 by way of the spherical sector 1.

The suspension device shown in FIG. 2 functions in substantially the same way as that shown in FIG. 1. The rest position of the chassis 6 and the horizontal resonance can be determined by the additional return springs 8 which engage the support member 2. The point of engagement of the return springs 8, which is effective in respect of the chassis 6, lies at the support point of the support member 2 on the spherical surface of the sector 1, that is, it is defined by the point of contact of the spherical surface with the flat surface of the co-operating mounting 7.

In order not to cause any additional moments due to inertia forces, it is advantageous for the centre of gravity of the oscillatory system to be disposed at the height of the point of contact between the spherical surface of the sector 1 and the flat surface of the mounting 7. If a plurality of support or suspension devices of the kind illustrated are used to support the chassis 6, it is desirable for the centre of gravity of the oscillatory system to be placed at the centre of force of the points of contact of the support members 2 with the chassis 6.

In the suspension device shown in FIG. 3, the spherical or rolling surface 10 is in the co-operating mounting 9 of the chassis 6. The flat support surface of the portion 11 of the support member 2 bears, in this arrangement, against the rolling surface 10. The mounting ball 12 at the other end of the support member 2 is mounted in the resilient mounting element 13 and acts as the pivotal joint. The radius of the spherical surface 10 is also such that, in the event of horizontal movement of the chassis 6, the spacing with respect to the mounting ball 12 remains cnstant. Accordingly, the suspension device shown in FIG. 3 behaves in a similar manner to that shown in FIG. 1. If the resilient lower mounting element 13 is of a suitable construction, this can also provide return forces in a horizontal direction as are provided in the FIG. 2 device by the return springs 8.

The suspension device shown in FIG. 4 is in principle of the same construction as that shown in FIG. 1. In this case, however, the position of installation of the support member 2 with the spherical surface of the sector 1 and the pivotal joint 3 is reversed with respect to the chassis 6 and the support 14.

In the device of FIG. 4, if the chassis 6 with the pivotal joint 3 moves in a horizontal direction relative to the structure 14, the spherical surface of the sector 1 rolls on the flat surface of the co-operating mounting 7. The support member 2 thus moves about the pivotal joint 3. If the radius of the sector 1 corresponds to the distance of the spherical surface of the sector from the joint 3, then the distance between the chassis 6 and the co-operating mounting 7 remains constant in the range of rolling movement. That is to say, an imaginary line connecting the pivotal joint 3 on the chassis 6 and the support point of the spherical surface of the sector 1 on the flat surface of the co-operating mouting 7 always extends in a vertical direction. In this embodiment also, there is no dynamic loading of the vertically-acting compression spring 5 in the event of horizontal movement of the chassis 6.

It may be desirable, in the case of the illustrated suspension devices, to provide additional damping means. For example, this can be done in a simple manner by the co-operating mounting 7 or 9 being made of a resilient material which is subject to loss so as to cause damping. In addition, it is possible for the mounting 7 or 9 to be supported with respect to the chassis 6 by a damping material.

It has been found desirable in record players for the vertical resonance frequency to be made higher than the horizontal resonance frequency of the oscillating system. This provides an additional way of preventing rotary oscillations of the chassis 6. It might be said that this introduces a preferential direction for the reaction movement.

The possibility of completely separating horizontal and vertical oscillation movements, or horizontally and vertically acting resilient members, provides a substantially improved degree of adaptation to specific requirements made in regard to the suspension device. This separation can be taken to such an extent that the points of force engagement of the spring members for vertical and horizontal movements on the chassis 6 can be spatially separated from each other.

We claim:

1. A recording and/or reproducing apparatus comprising a stationary structure, a chassis which carries means for recording and/or reproducing, and at least one suspension means including resilient means which mounts said chassis to said structure in a manner permitting oscillating movement of said chassis with respect to said structure in three orthogonal directions, the oscillatory movements experienced by said chassis in the three orthogonal directions being decoupled from each other, said chassis being spaced vertically above the part of said stationary structure mounting said chassis, said suspension means including a pivotal joint, a support member pivotally mounted at said pivotal joint, a first support surface provided on said support member, and a second support surface associated with one of said stationary structure and said chassis, said first and second support surfaces being positioned in such manner that during oscillating movement of said chassis in a horizonal plane different points on said first and second support services meet at a support point, the support point being in vertical alignment with said pivotal joint in any relative position of said chassis and structure occupied during said oscillating movement of said chassis with respect to said structure.

2. The improvement of claim 1 wherein said support member is resiliently biased in a vertical direction by said resilient element.

3. The improvement of claim 1 wherein each support point established during said movement of said chassis with respect to said structure lies on a common spherical surface.

4. The improvement of claim 3 wherein said spherical surface has a radius which corresponds to the distance between said pivotal joint and the support point established when said oscillatory system is in a rest condition.

5. The improvement of claim 3 including a mounting fitted to said chassis, said spherical surface comprising said second support surface and being provided on said mounting, and a co-operating mounting formed on said support member on which said first support surface, which is flat, is provided, said spherical surface rolling against said flat surface during said horizontal movement of said chassis with respect to said structure.

6. The improvement of claim 3 wherein said spherical surface comprises said first support surface provided on said support member and a mounting is fitted on said chassis on which is provided said second support surface, which is flat, and against which said spherical surface rolls during horizontal movement of said chassis with respect to said structure.

7. The improvement of claim 3 wherein said spherical surface comprises said first support surface provided on said support member, said resilient means includes a compression spring, and a member supported by said compression spring on said stationary structure, said member being provided with said second support surface, which is flat, and against which said spherical surface rolls during horizontal movement of said chassis with respect to said structure.

8. The improvement of claim 1 wherein the common center of gravity of said chassis and of said means for recording and/or reproducing lies in a horizontal plane which includes said support point.

9. The improvement of claim 1 wherein said pivotal joint is disposed on said chassis and the common center of gravity of said chassis and of said means for recording and/or reproducing lies in a horizontal plane which includes said pivotal joint.

10. The improvement of claim 1 wherein at least one return spring engages said support member.

11. The improvement of claim 10 wherein a plurality of said return springs engage said support member and the static forces of the return springs mutually cancel each other.

12. The improvement of claim 11 wherein the forces of said return springs are directed perpendicularly to an imaginary line connecting said support point and said pivotal joint.

13. The improvement of claim 1 wherein said resilient means acts on a lower end of said support member and includes means for positively guiding said support member in a permitted direction of movement.

14. The improvement of claim 1 wherein a plurality of said suspension means are provided and the common center of gravity of said chassis and of said means for recording and/or reporting coincides with the center of force of forces applied to said chassis by way of said support members of said plurality of suspension devices.

15. The improvement of claim 1 wherein damping means are provided which co-operate with said resilient means.

16. The improvement of claim 10 wherein damping means are provided which co-operate with said at least one return spring.

17. The improvement of claim 1 wherein said support member co-operates with a mounting having damping material.

18. The improvement of claim 1 wherein said support member co-operates with a mounting, said mounting being in turn mounted by a damping material.

19. The improvement of claim 1, wherein the resonance frequency of said oscillatory system is higher in one direction of oscillation than in another direction of oscillation.

* * * * *